United States Patent [19]
Kojo

[11] Patent Number: 5,706,412
[45] Date of Patent: Jan. 6, 1998

[54] SYSTEM FOR SELECTIVELY DELETING PRINT JOBS STORED IN A RECEPTION BUFFER BASED ON DELETION DATA RECEIVED FROM AN EXTERNAL APPARATUS

[75] Inventor: Yoshiyuki Kojo, Yokohama, Japan

[73] Assignee: Canon Kabushiki Kaisha, Tokyo, Japan

[21] Appl. No.: 140,498

[22] Filed: Oct. 25, 1993

[30] Foreign Application Priority Data

Oct. 30, 1992 [JP] Japan ................... 4-315882

[51] Int. Cl.$^6$ ................... G06F 12/06; G06F 3/12
[52] U.S. Cl. ................... 395/113; 395/101; 395/115
[58] Field of Search ................... 395/275, 425, 395/101, 113, 115, 835, 839, 872

[56] References Cited

U.S. PATENT DOCUMENTS

| | | | |
|---|---|---|---|
| 3,643,227 | 2/1972 | Smith et al. | 340/172.5 |
| 4,441,163 | 4/1984 | Leikam et al. | 364/900 |
| 4,587,629 | 5/1986 | Dill et al. | 364/900 |
| 4,839,798 | 6/1989 | Eguchi et al. | 364/200 |
| 5,036,476 | 7/1991 | Yamaguchi et al. | 364/519 |
| 5,287,434 | 2/1994 | Bain et al. | 395/101 |
| 5,371,888 | 12/1994 | Lehnertz et al. | 395/650 |

FOREIGN PATENT DOCUMENTS

| | | |
|---|---|---|
| 332779 | 9/1989 | European Pat. Off. . |
| 479494 | 4/1992 | European Pat. Off. . |

OTHER PUBLICATIONS

"Page Printer Message Handler", IBM Technical Disclosure Bulletin, vol. 35, No. 5, Oct. 1992, pp. 278-280.

*Primary Examiner*—Lange Leonard Barry
*Assistant Examiner*—Rehana Perveen Krick
*Attorney, Agent, or Firm*—Fitzpatrick, Cella, Harper & Scinto

[57] ABSTRACT

In a printing-information processing method and apparatus, print jobs input from outside are sequentially stored in a reception buffer, analysis information of each of the stored print jobs is stored in a page buffer in parallel with the reception of the print jobs, and page data obtained from the stored analysis information is sequentially stored in the frame buffer. At that time, data for assigning deletion of a job input from the outside is also stored. Hence, an assigned print job stored in the reception buffer, or analysis information or page data stored in the page buffer or the frame buffer, respectively, corresponding to the assigned print job is deleted by analyzing the stored data for assigning deletion of a print job.

29 Claims, 7 Drawing Sheets

SYSTEM FOR SELECTIVELY DELETING PRINT JOBS STORED IN A RECEPTION BUFFER BASED ON DELETION DATA RECEIVED FROM AN EXTERNAL APPARATUS

BACKGROUND OF THE INVENTION

1. Field of the Invention

The present invention relates to a printing-information processing method and apparatus for use in a printer, which is provided with buffers for temporarily storing data transmitted from a host.

2. Description of the Related Art

In conventional apparatus of this kind, the printer is provided with a buffer for temporarily storing data transmitted from a host, such as a host computer. Printing processing is executed by analyzing data stored in the buffer, for example by bit-map development processing, and outputting an image signal to a print engine.

In some apparatus, the buffer can spool a plurality of data (or print jobs) transmitted from the host. Some apparatus also have the ability to delete data stored in a buffer according to an instruction from an operation panel on the main body of the apparatus so that subsequent data can be received.

However, deleting data within the buffer of a conventional apparatus clears all storable regions of the buffer. Hence, when a received unnecessary job is stored in an arbitrary order in the buffer, the succeeding job cannot be processed until the unnecessary job is output, and therefore a considerable time is required until the succeeding necessary job is output, causing, for example, a waste of paper resources. On the other hand, if the above-described deleting processing of the buffer is performed, communication processing for receiving again the necessary job from the host apparatus is required, and the host apparatus must retransmit the necessary job, causing, for example, a large loss in the data processing efficiency.

SUMMARY OF THE INVENTION

The present invention has been made in consideration of the above-described problems.

It is an object of the present invention to provide a printing-information processing method and a printing information processing apparatus, in which an arbitrary print job from among pring jobs sequentially stored in a reception buffer, and data stored in a page buffer and a frame buffer relating the print job can be selectively deleted based on input data for assigning deletion of a job.

According to one aspect, the present invention which achieves this object relates to a printing-information processing method and apparatus, in which data for assigning deletion of a job arbitrarily input by interrupt from the outside is stored while print jobs in units of a specific command group input from the outside are sequentially stored in a reception buffer, analysis information of each of the stored print jobs is stored in a page buffer, and page data obtained from the stored analysis information are sequentially stored in a frame buffer. The stored data for assigning deletion of a job is analyzed, and an assigned print job stored in the reception buffer, or analysis information or page data stored in the page buffer or the frame buffer, respectively, corresponding to the assigned print data is deleted.

In the printing-information processing method and apparatus of the present invention, print jobs input from the outside are sequentially stored in the reception buffer, analysis information of each of the stored print jobs is stored in the page buffer in parallel with the reception of the print job, and page data obtained from the stored analysis information are sequentially stored in the frame buffer. At that time, since data for assigning deletion of a job input from the outside is stored, an assigned print job stored in the reception buffer, or analysis information or page data stored in the page buffer or the frame buffer, respectively, corresponding to the assigned print job is deleted. Hence, even if a plurality of print jobs are stored in the reception buffer, only the assigned print job can be deleted, and analysis information or page data stored in the page buffer or the frame buffer, respectively, corresponding to the assigned print job can also be deleted.

DESCRIPTION OF THE PREFERRED EMBODIMENTS

First Embodiment

Figure 1:
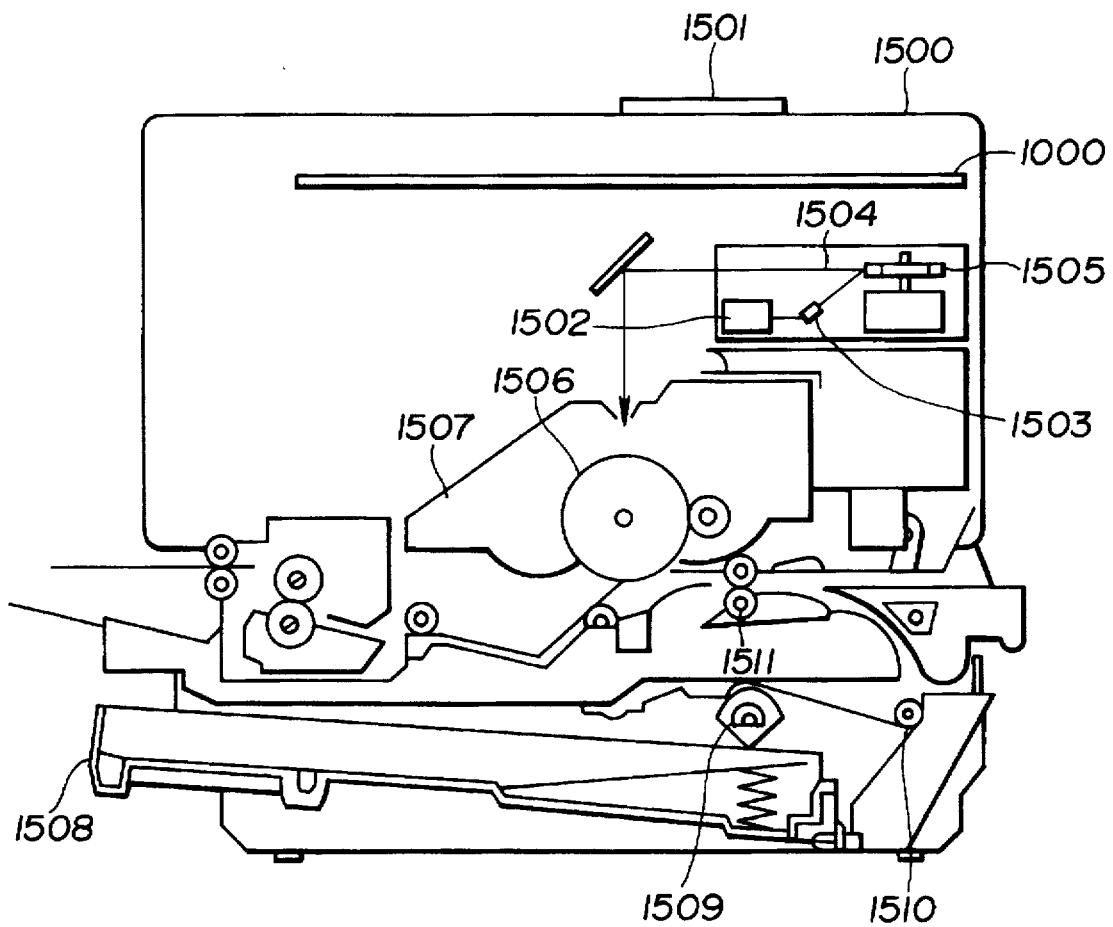
FIG. 1 is a cross-sectional view illustrating the configuration of a printer to which a printing-information processing apparatus of the present invention can be applied.

FIG. 1 is a cross-sectional view illustrating the configuration of a printer to which a printing-information processing apparatus of the present invention can be applied, and illustrates the case of using a laser-beam printer (LBP). The LBP can register character patterns, document forms and the like from a data source (not shown).

In FIG. 1, main body (printer) 1500 of the LBP receives and stores print information (character codes and the like), form information, macro-instructions and the like supplied from a host computer connected to the LBP, forms character patterns (generated from character-pattern processing according to the invention), a form pattern and the like in accordance with the stored information, and forms an image on recording paper, serving as a recording medium. Operation panel 1501 includes switches for operations, an LED (light-emitting diode) display unit, and the like. Printer control unit 1000 controls the entire main body 1500 of the LBP and analyzes character information and the like supplied from the host computer. Printer control unit 1000 mainly converts character information into a video signal representing character patterns, and outputs the video signal to laser driver 1502.

Laser driver 1502 is a circuit for driving semiconductor laser 1503, and switches on and off laser light 1504 emitted from semiconductor laser 1503 in accordance with the input video signal. Laser light 1504 is deflected in directions perpendicular to the plane of FIG. 1 to scan and expose the surface of electrostatic drum 1506. Thus, an electrostatic latent image of character patterns is formed on electrostatic drum 1506. The latent image is developed by developing unit 1507 disposed around electrostatic drum 1506, and the developed image is transferred onto recording paper. The recording paper comprises cut sheets, which are accommodated within sheet cassette 1508 mounted in main body 1500 of the LBP. Each sheet of the recording paper is conveyed within the apparatus by sheet-feeding roller 1509, conveying roller 1510 and conveying roller 1511, and is supplied to electrostatic drum 1508.

Figure 2:
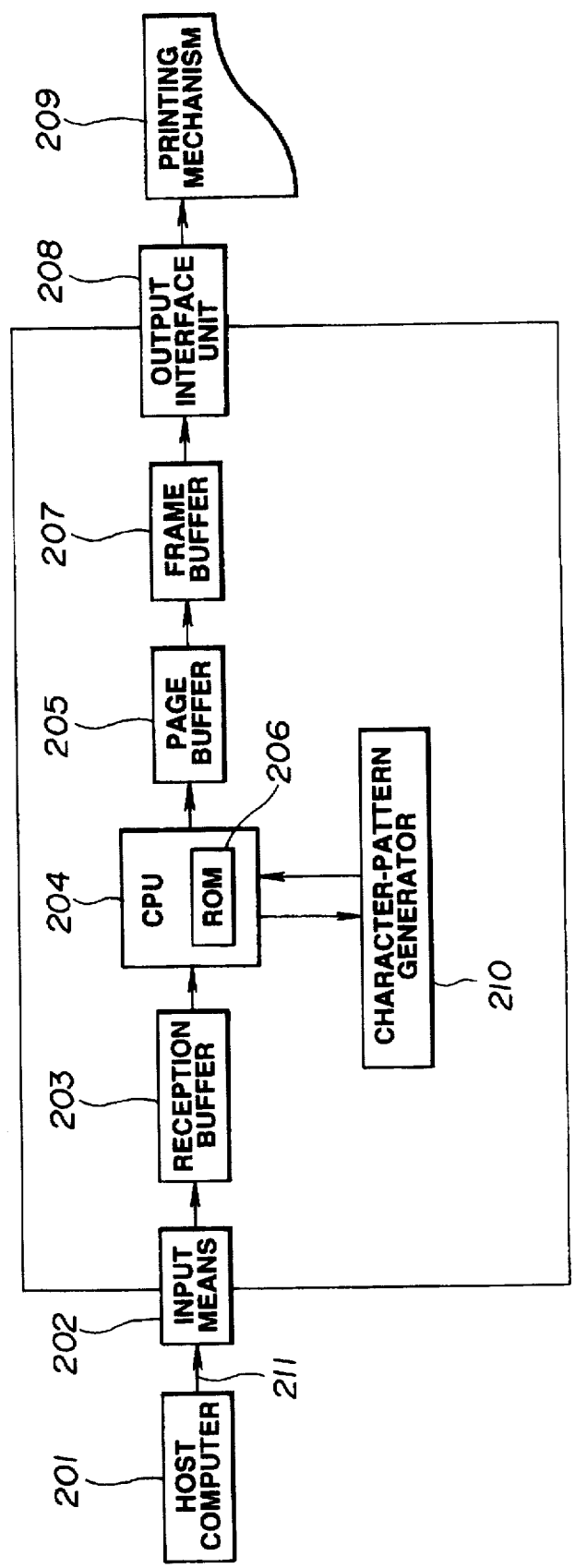
FIG. 2 is a block diagram illustrating the configuration of a printing-information processing apparatus according to an embodiment of the present invention.

FIG. 2 is a block diagram illustrating the configuration of a printing-information processing apparatus according to an embodiment of the present invention.

In FIG. 2, host computer 201, serving as a generation source of image information, transmits information 211, comprising character-code information, character-font information, form information, macro-registration information and the like, to input means 202 of the LBP. Reception buffer 203 temporarily stores various kinds of information input via input means 202. Character-pattern generator 210 includes a font ROM (read-only memory) storing pattern information for respective character codes, and a reading control circuit for the ROM. Character-pattern generator 210 has the code conversion function of calculating the address of the character pattern corresponding to an input character code.

CPU 204 controls the entire control system of the LBP, and controls the entire apparatus by control programs (whose flowcharts will be described later) of CPU 204 stored in ROM 208. Page buffer 205 analyzes the information stored in reception buffer 203, and stores data obtained by the analysis as intermiate data before development. Frame buffer 207 stores pattern information developed in character patterns for print images of at least one page. Output interface unit 208 generates a video signal corresponding to the pattern information from frame buffer 207, and executes interface control for printing mechanism (printer engine) 209. Printing mechanism 209 receives the video signal from output interface unit 208, and prints image information in accordance with the video signal.

In the printing-information processing apparatus having the above-described configuration, if data for assigning deletion of a job for deleting a desired print job stored in reception buffer 203 is input from assigning means while print jobs in units of a specific command group input from the outside are sequentially stored in reception buffer 203, analysis means (CPU 204) analyzes each of the print jobs, obtained analysis information is stored in page buffer 205, and page data obtained from the stored analysis information are stored in frame buffer 207, the input data for assigning deletion of a job is held in RAM (random access memory) 211, and CPU 204 deletes the assigned print job stored in reception buffer 203 based on the state of registration of the data for assigning deletion of a job in RAM 211, or deletes analysis information or page data stored in page buffer 205 or frame buffer 207, respectively, based on the assigned print job. Accordingly, even if a plurality of print jobs are stored in reception buffer 203, it is possible to delete only the assigned print job, as well as analysis information or page data stored in page buffer 205 or frame buffer 207, respectively, corresponding to the assigned print job.

In addition, since data for assigning deletion of a job for deleting a desired print job stored in reception buffer 203 is input from the operation panel of the main body of the printer, the assignment of deletion of a print job input from the outside can be performed at the side of the main body of the apparatus.

Furthermore, since data for assigning deletion of a job for deleting a desired print job stored in reception buffer 203 is input from external host computer 201, the assignment of deletion of a print job input from the outside can be performed from the data source.

Figure 3:
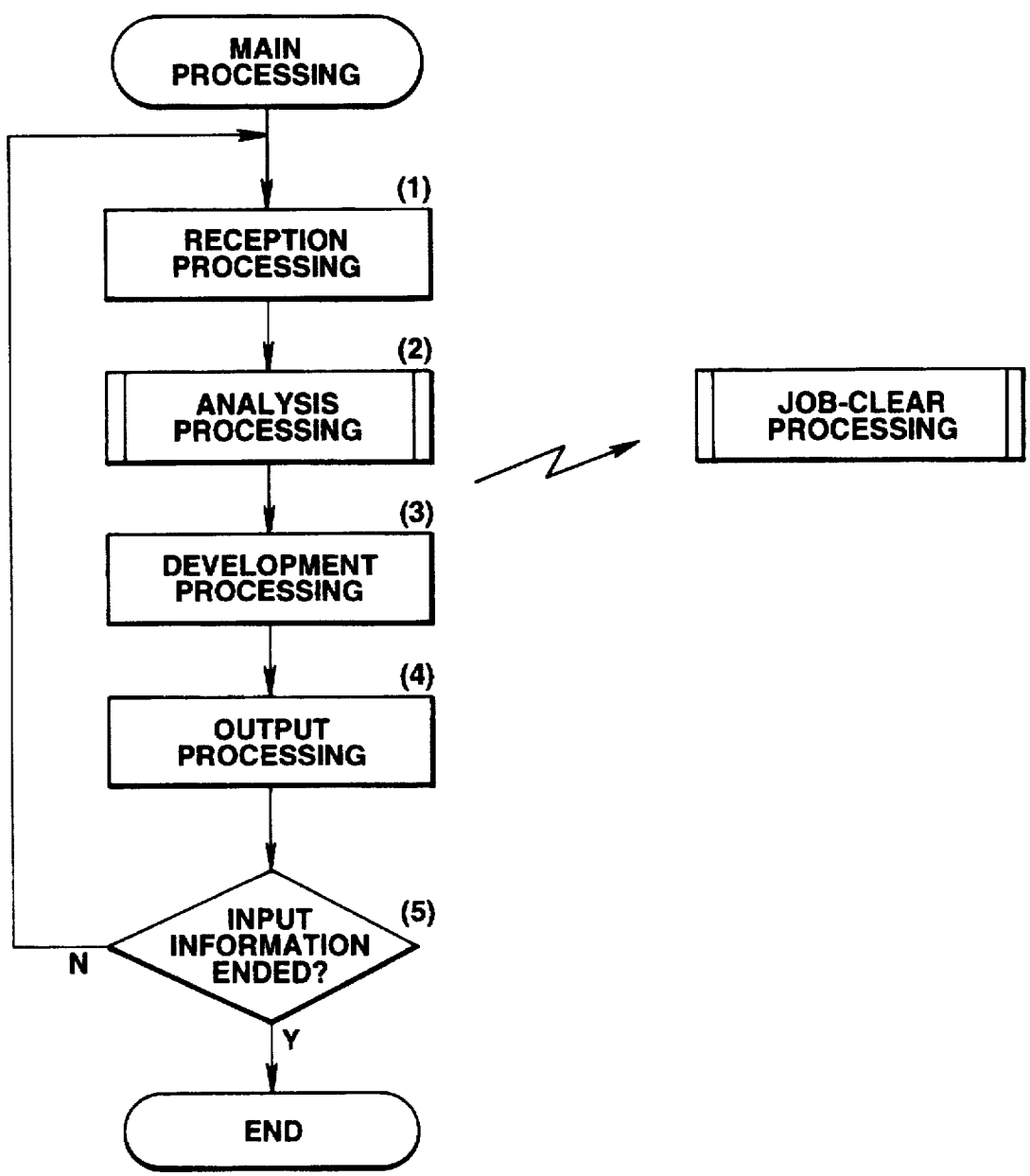
FIG. 3 is a flowchart illustrating a main processing procedure in the printing-information processing apparatus shown in FIG. 2.

First, a description will be provided of the operation of data processing from host computer 201 with reference to FIG. 3.

FIG. 3 is a flowchart illustrating a main processing procedure in the printing-information processing apparatus shown in FIG. 2. Numerals (1)–(5) represent respective steps.

First, reception processing is performed when printing data has been input (step (1)). Upon completion of the reception processing, analysis processing of the printing data is performed (step (2)), and bit-map data development processing is performed (step (3)). Thereafter, output processing of outputting developed bit-map data to a printer engine (not shown) is performed (step (4)). In step (5), it is determined if the input of information has ended. If the result of the determination is negative, the process returns to step (1). If the result of the determination is affirmative, the processing is terminated. While such processing is executed, CPU 204 monitors if an interrupt request of job-clear processing has occurred from the outside through the operation panel or the like. When an interrupt request of job-clear processing has been recognized, job-clear interrupt processing shown in FIG. 4 is started.

Figure 4:
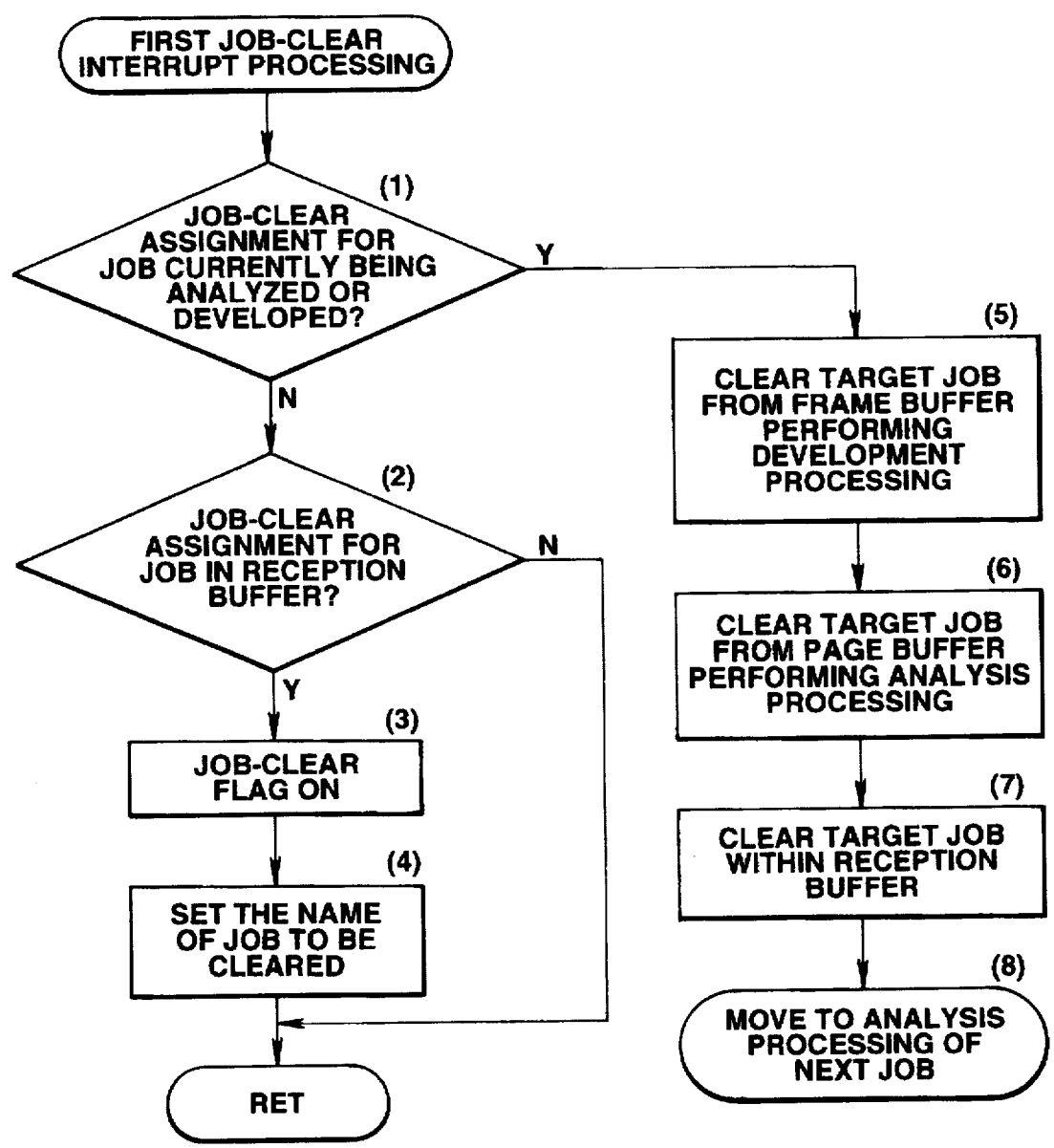
FIG. 4 is a flowchart illustrating the procedure of first job-clear interrupt processing in the printing-information processing apparatus shown in FIG. 2.

FIG. 4 is a flowchart illustrating the procedure of first job-clear interrupt processing in the printing-information processing apparatus of the present invention. Numerals (1)–(8) represent respective steps.

First, it is determined if the job to be cleared is a job currently being analyzed, developed or output (step (1)). If the result of the determination is affirmative, data being output is output. At the same time, if data being developed is present in frame buffer 207, that data is cleared (step (5)). If data corresponding to the target job is present in page buffer 205, that data is cleared (step (6)). If data of the target job is present in reception buffer 203, that data is cleared (step (7)), and the process proceeds to analysis processing of the next job (step (8)).

If the result of the detemination in step (1) is negative, it is determined if the job to be cleared is present in reception buffer 203 (step (2)). If the result of the determination is negative, the process returns to ordinary processing. If the result of the determination is affirmative, a job-clear flag is switched on (step (3)), and the name of the job to be cleared is set in an assigned storage area (step (4)), and the process returns to the main processing shown in FIG. 3.

Figure 5:
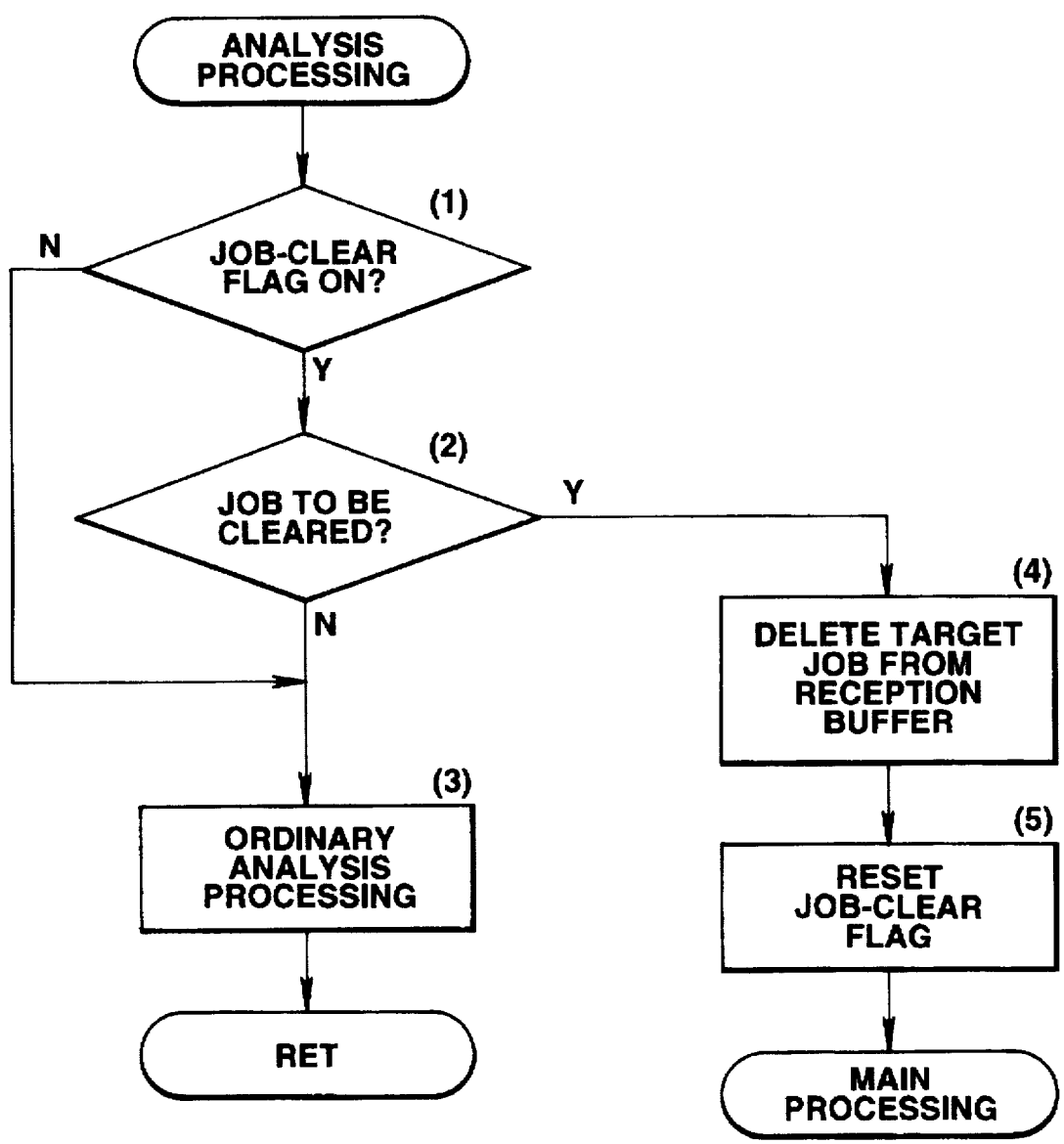
FIG. 5 is a flowchart illustrating a detailed procedure of the analysis processing routine shown in FIG. 3.

FIG. 5 is a flowchart illustrating a detailed procedure of the analysis processing routine shown in FIG. 3. Numerals (1)–(5) represent respective steps.

First, it is determined if a job-clear flag is switched on according to the flowchart shown in FIG. 4. If the result of the determination is negative, the process proceeds to step (3), where ordinary analysis processing is executed, and the process is terminated.

If the result of the determination in step (1) is affirmative, it is determined if the job transferred from reception buffer 203 is the job to be cleared by comparing the transferred job with the name of the job set in the storage area (step (2)). If the result of the determination is negative, the process proceeds to step (3). If the result of the determination is affirmative, the target job is deleted from reception buffer 203 (step (4)), the job-clear flag is reset (step (5)), and the process returns to the main processing.

Figure 6:
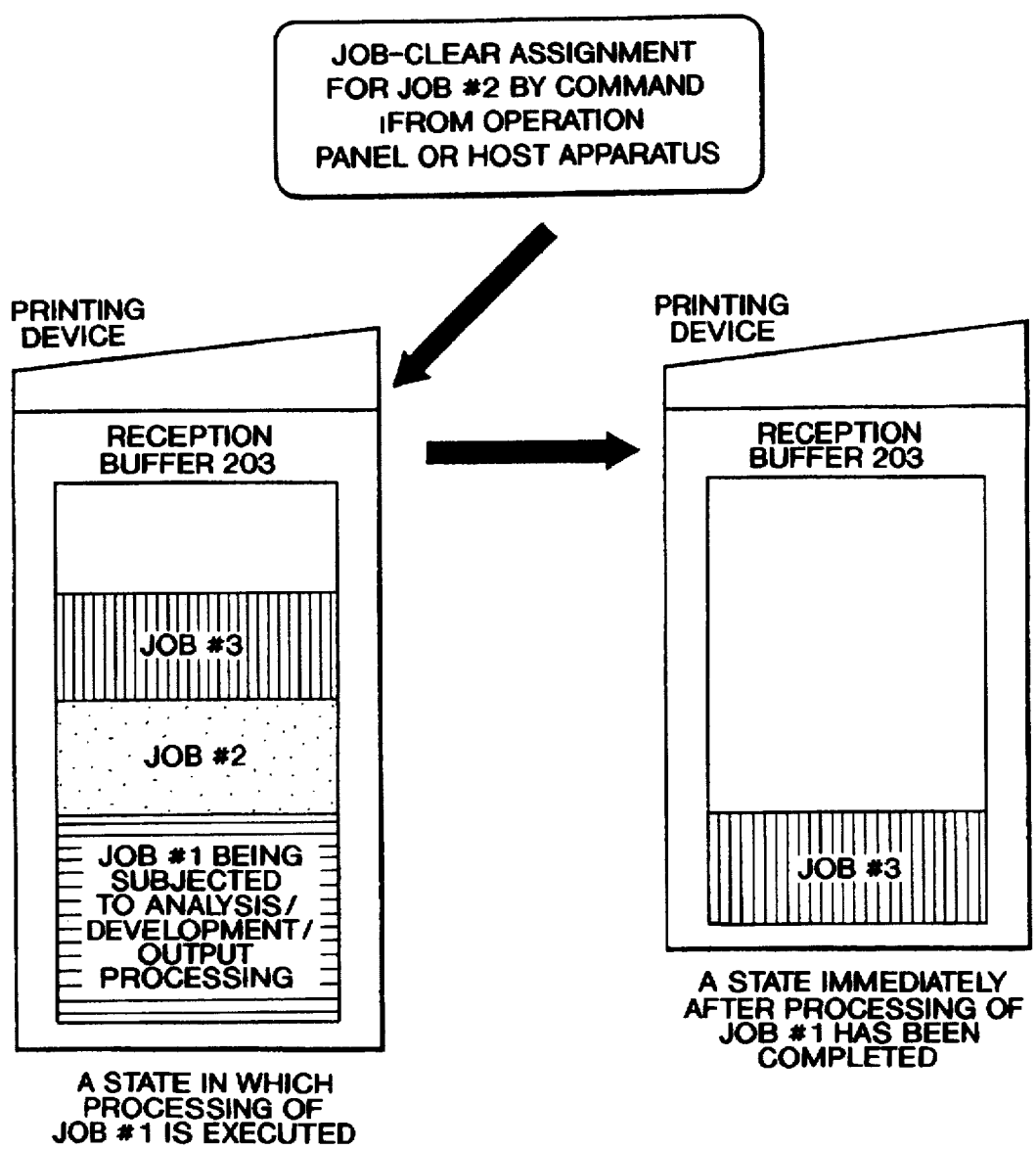
FIG. 6 is a schematic diagram illustrating states of processing of deleting an assigned job in the printing-information processing apparatus of the invention.

Accordingly, as shown in FIG. 6, when a command to clear job #2 has been input to input means 202 from the outside (for example, from the operation panel or from host computer 201, serving as the host apparatus) while jobs #1–#3 are stacked in reception buffer 203 and job #1 is being analyzed, developed and output, printing data for job #2 is deleted after the completion of the processing of job #1. As a result, only job #3 remains stacked on reception buffer 203, and the processing of analyzing, developing and outputting job #3 is started.

As described above, in the printing-information processing method of the present invention, while print jobs input from the outside are sequentially stored in reception buffer 203, analysis information of each of the stored print jobs is stored in page buffer 205 in parallel to the reception of the print jobs, and page data obtained from the stored analysis information are sequentially stored in frame buffer 207, data for assigning deletion of a job input from the outside is stored in RAM 211. The assigned print job stored in reception buffer 203, or analysis information or page data stored in page buffer 205 or frame buffer 207, respectively, corresponding to the assigned print job is deleted by analyzing the stored data for assigning deletion of a job. Hence, even if a plurality of print jobs are stored in reception buffer 203, it is possible to delete only the assigned print job, as well as analysis information or page data stored in page buffer 205 or frame buffer 207, respectively, corresponding to the assigned print job.

In the above-described embodiment, a description has been provided of the case in which allocation of data from input means 202 is not performed within reception buffer 203. However, in printer having a plurality of input means in which data can be allocated in reception buffer 203 so as to correspond to the respective input means, the corresponding input means may be assigned in job-clear assignment. That is, since print jobs input via respective data input units (not shown) are registered in reception buffer 203 while being allocated by CPU 204, it is possible to delete only the print job input via the assigned data input unit from reception buffer 203, as well as analysis information or page data stored in page buffer 205 or frame buffer 207, respectively, corresponding to the assigned print job.

Second Embodiment

Figure 7:
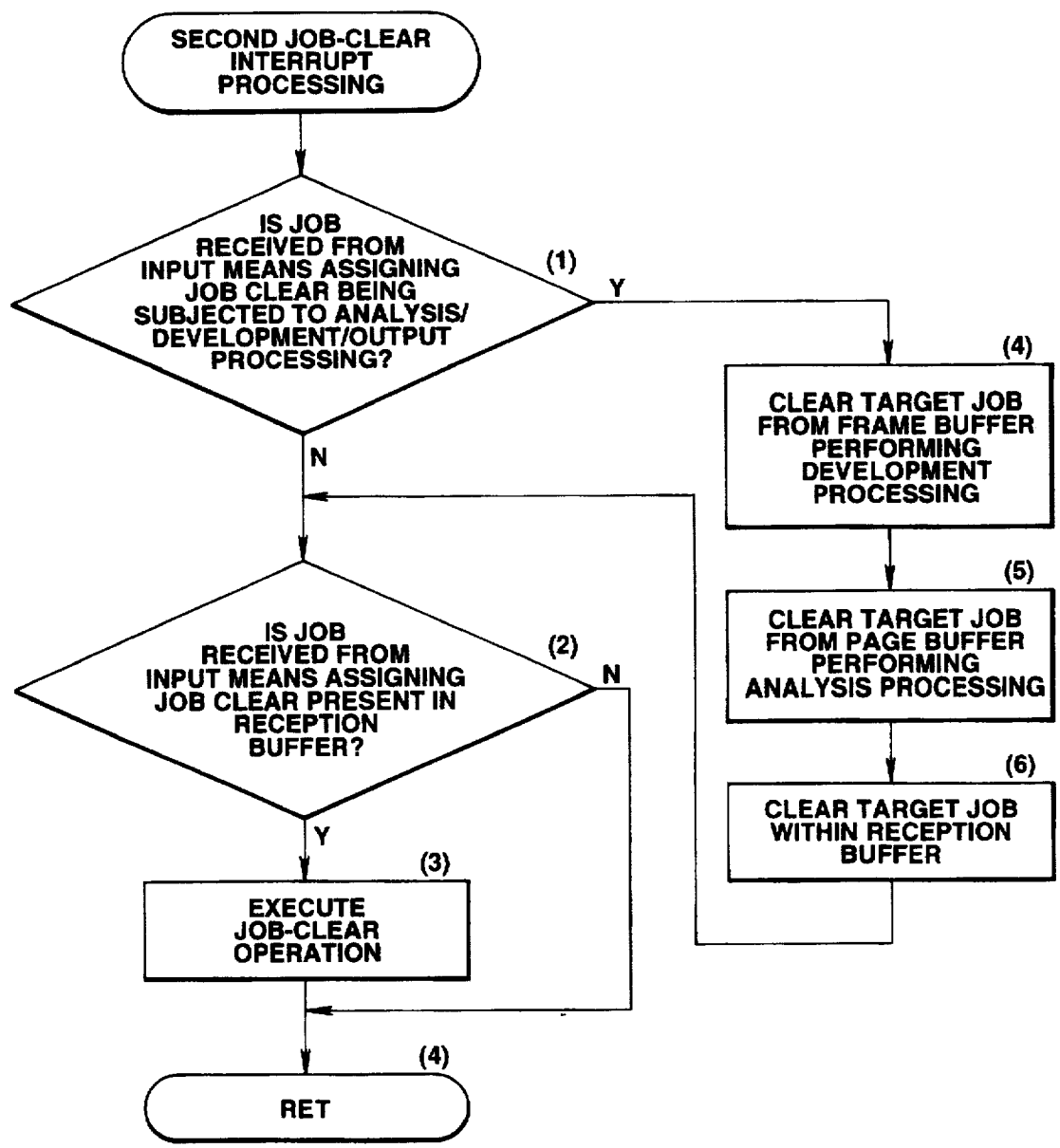
FIG. 7 is a flowchart illustrating the procedure of second job-clear interrupt processing in the printing-information processing apparatus of the invention.

FIG. 7 is a flowchart illustrating the procedure of second job-clear interrupt processing in the printing-information processing apparatus of the present invention. Numerals (1)–(6) represent respective steps.

When a job-clear interrupt has been received from the outside in the main processing shown in FIG. 3, it is determined if the job received from input means which assigns job clear is currently being subjected to analysis/development/output processing (step (1)). If the result of the determination is affirmative, in parallel with the processing of outputting printing data being output, if it is present, the contents of frame buffer 207 performing development processing are cleared (step (4)), the contents of page buffer 205 performing analysis processing are cleared (step (5)), the corresponding job remaining in reception buffer 203 is cleared (step (6)), and the process returns to step (2).

On the other hand, if the result of the determination in step (1) is negative, it is determined if the corresponding job is stored in the region of reception buffer 203 corresponding to the input means which assigns job clear (step (2)). If the result of the determination is negative, the process returns to the main processing. If the result of the determination is affirmative, the corresponding job is cleared from reception buffer 203 (step (3)). Thus, the processing is terminated, and the process returns to the main processing.

As described above, in the printing-information processing method of the present invention, while print jobs input from the outside are sequentially stored in reception buffer 203, analysis information of each of the stored print jobs is stored in page buffer 205 in parallel to the reception of the print jobs, and page data obtained from the stored analysis information are sequentially stored in frame buffer 207, data for assigning deletion of a job input from the outside is stored. The assigned print job stored in reception buffer 203, or analysis information or page data stored in page buffer 205 or frame buffer 207, respectively, corresponding to the assigned print job is deleted by analyzing the stored data for assigning deletion of a job. Hence, even if a plurality of print jobs are stored in reception buffer 203, it is possible to delete only the assigned print job, as well as analysis information or page data stored in page buffer 205 or frame buffer 207, respectively, corresponding to the assigned print job.

In the printing-information processing apparatus of the present invention, if data for assigning deletion of a job for deleting a desired print job stored in reception buffer 203 is input from assigning means while print jobs in units of a specific command group input from the outside are sequentially stored in reception buffer 203, analysis means analyzes each of the print jobs, obtained analysis information is stored in page buffer 205, and page data obtained from the stored analysis information is stored in frame buffer 207, the input data for assigning deletion of a job is held in holding means, and job deletion means deletes the assigned print job stored in reception buffer 203, or analysis information or page data stored in page buffer 205 or frame buffer 207, respectively, corresponding to the assigned signed print job based on the state of registration of the job deletion assigning data in the holding means. Accordingly, even if a plurality of print jobs are stored in reception buffer 203, it is possible to delete only the assigned print job, as well as analysis information or page data stored in page buffer 205 or frame buffer 207, respectively, corresponding to the assigned print job.

In addition, since data for assigning deletion of a job for deleting a desired print job stored in reception buffer 203 is input from the operation panel of the main body of the printer, the assignment of deletion of a print job input from the outside can be performed at the side of the main body of the apparatus.

Furthermore, since data for assigning deletion of a job for deleting a desired print job stored in reception buffer 203 is input from external host computer 201, the assignment of deletion of a print job input from the outside can be performed from the data source.

Since print jobs input via respective data input units are registered in reception buffer 203 while being allocated by registration means, it is possible to delete only the print job input via the assigned data input unit from reception buffer 203, as well as analysis information or page data stored in page buffer 205 or frame buffer 207, respectively, corresponding to the assigned print job.

Accordingly, the present embodiment has advantages in that, for example, any of print jobs sequentially stored in the reception buffer can be easily selected and deleted.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing-information processing method, comprising the steps of:

inputting print jobs in units of a command group from an external apparatus;

storing the print jobs in a reception buffer;

inputting deletion data from the external apparatus;

storing the deletion data in a holding means;

assigning deletion of a print job based on the deletion data;

analyzing the assigned print job to produce analysis information corresponding to the print job;

storing the analysis information in a page buffer, at least a portion of the assigned print job being stored in the reception buffer during analysis of the assigned print job;

determining whether the assigned print job is currently being analyzed; and deleting analysis information corresponding to portions of the assigned print job, analyzed in the analyzing step, from the page buffer when the determining step determines that the assigned print job is currently being analyzed, and deleting the assigned print job from the reception buffer when the determining step determines that the assigned print job is not currently being analyzed.

2. A printing-information processing apparatus comprising:

a reception buffer for sequentially storing print jobs in units of a command group input from an external apparatus;

analysis means for analyzing each of the stored print jobs;

a page buffer for storing analysis information provided by said analysis means;

inputting means for inputting deletion data from the external apparatus;

assigning means for receiving the deletion data and for assigning deletion of a print job based on the received deletion data, at least a portion of the print job being stored in said reception buffer;

holding means for holding the deletion data received from said assigning means;

determining means for determining whether the assigned print job is currently being analyzed by said analysis means; and job deletion means for deleting (1) analysis information corresponding to portions of the assigned print job, analyzed by said analysis means, from said page buffer when said determining means determines that the assigned print job is currently being analyzed and (2) the assigned print job from said reception buffer when said determining means determines that said analysis means is not currently analyzing the assigned print job.

3. An apparatus according to claim 2, wherein said assigning means comprises an operation panel provided in a main body of a printer.

4. An apparatus according to claim 2, wherein said assigning means comprises an external host computer.

5. An apparatus according to any of claims 2 through 4, further comprising:

a plurality of data input units; and registration means for registering respective print jobs input via said data input units in said reception buffer while allocating the print jobs.

6. A method according to claim 1, wherein the deletion data for assigning deletion of a job is obtained by an instruction from an operation panel provided in a main body of a printer.

7. A method according to claim 1, wherein the deletion data for assigning deletion of a job comprises data from a host computer.

8. A method according to claim 1, further comprising the step of storing, in a memory, pattern data obtained from said stored analysis information.

9. A method according to claim 8, further comprising the step of forming an image in accordance with the pattern data stored in said memory.

10. An apparatus according to claim 2, further comprising a memory for storing pattern data obtained from said stored analysis information.

11. An apparatus according to claim 10, further comprising image forming means for forming an image in accordance with the pattern data stored in said memory.

12. A printing-information processing method according to claim 1, wherein the analysis information stored in the page buffer comprises data which is to be processed into bit map data.

13. A printing-information processing apparatus according to claim 2, wherein the analysis information stored in the page buffer comprises data which is to be processed into bit map data.

14. Computer-executable process steps stored on a computer-readable medium, the computer-executable process steps for processing and deleting print jobs input from an external apparatus, the computer executable process steps comprising:

an inputting step to input print jobs in units of a command group from an external apparatus;

a storing step to store the print jobs in a reception buffer;

an inputting step to input deletion data from the external apparatus;

a storing step to store the deletion data in a holding means;

an assigning step to assign deletion of a print job based on the deletion data;

an analyzing step to analyze the assigned print job to produce analysis information corresponding to the print job;

a storing step to store the analysis information in a page buffer, at least a portion of the assigned print job being stored in the reception buffer during analysis of the assigned print job;

a determining step to determine whether the assigned print job is currently being analyzed; and a deleting step to delete analysis information corresponding to portions of the assigned print job, analyzed in the analyzing step, from the page buffer when the determining step determines that the assigned print job is currently being analyzed, and to delete the assigned print job from the reception buffer when the determining step determines that the assigned print job is not currently being analyzed.

15. Computer-executable process steps according to claim 14, wherein the analysis information stored in the page buffer comprises data which is to be processed into bit map data.

16. A system which deletes print jobs and corresponding analysis information from a printer in response to input deletion data, the system comprising:

a host computer which generates and outputs print jobs, the print jobs being output in units of a command group; and a printer, connected to the host computer, which receives and analyzes the print jobs output from the host computer, and which deletes print jobs, and corresponding analysis information, based on the deletion data, the printer comprising:

a reception buffer which sequentially stores the print jobs received from the host computer;

a page buffer which stores analysis information corresponding to print jobs which have been analyzed by the printer;

a memory which stores the deletion data received from the host computer; and a processor (1) which assigns deletion of a print job based on the received deletion data, at least a portion of the print job assigned for deletion being stored in the reception buffer, (2) which determines whether the print job assigned for deletion is currently being analyzed, and (3) which deletes analysis information from the page buffer corresponding to portions of the print job assigned for deletion when it is determined that the print job assigned for deletion is currently being analyzed, and which deletes the print job assigned for deletion from the reception buffer when it is determined that the print job assigned for deletion is not currently being analyzed.

17. A system according to claim 16, wherein the printer includes an operational panel through which the deletion data is input.

18. A system according to claim 16, wherein the host computer comprises an input unit through which the deletion data is input.

19. A system according to claim 16, wherein the host computer includes a plurality of data input units, through which the print jobs are input; and wherein the processor in the printer registers print jobs in the reception buffer.

20. A system according to claim 16, wherein the processor in the printer generates pattern data corresponding to analysis information for a print job stored in the page buffer; and wherein the printer further comprises a frame buffer for storing the pattern data.

21. A system according to claim 20, wherein the printer forms an image in accordance with the pattern data stored in the frame buffer.

22. A system according to claim 16, wherein the analysis information stored in the page buffer comprises data which is to be processed into bit map data.

23. A printer which receives and analyzes print jobs, and which deletes print jobs and corresponding analysis information based on deletion data input from an external source, the printer comprising:

a reception buffer which sequentially stores the print jobs;

a page buffer which stores analysis information corresponding to print jobs which have been analyzed by the printer;

a memory which stores the deletion data input from the external source; and a processor (1) which assigns deletion of a print job based on the received deletion data, at least a portion of the print job assigned for deletion being stored in the reception buffer, (2) which determines whether the print job assigned for deletion is currently being analyzed, and (3) which deletes analysis information from the page buffer corresponding to portions of the print job assigned for deletion when it is determined that the print job assigned for deletion is currently being analyzed, and which deletes the print job assigned for deletion from the reception buffer when it is determined that the print job assigned for deletion is not currently being analyzed.

24. A printer according to claim 23, wherein the external source comprises an operational panel on the printer.

25. A printer according to claim 23, wherein the external source comprises a host computer having an input unit through which the deletion data is input.

26. A printer according to claim 23, wherein the printer is connected to a host computer having a plurality of data input units, the print jobs being input to the printer via the plurality of data input units on the host computer; and wherein the processor registers the print jobs in the reception buffer.

27. A printer according to claim 23, wherein the processor generates pattern data corresponding to analysis information for a print job stored in the page buffer; and wherein the printer further comprises a frame buffer for storing the pattern data.

28. A printer according to claim 27, wherein the printer forms an image in accordance with the pattern data stored in the frame buffer.

29. A printer according to claim 23, wherein the analysis information stored in the page buffer comprises data which is to be processed into bit map data.

* * * * *

UNITED STATES PATENT AND TRADEMARK OFFICE
CERTIFICATE OF CORRECTION

PATENT NO. : 5,706,412
DATED : January 6, 1998
INVENTOR(S) : Yoshiyuki Kojo

It is certified that error appears in the above-identified patent and that said Letters Patent is hereby corrected as shown below:

Delete the Title page and substitute therefor the attached title page.

Delete the specification, columns 1-10, and substitute therefor the attached specification, columns 1-10.

Signed and Sealed this

Twenty-second Day of November, 2005

JON W. DUDAS
*Director of the United States Patent and Trademark Office*

United States Patent [19]
Kojo

[11] Patent Number: 5,706,412
[45] Date of Patent: Jan. 6, 1998

[54] SYSTEM FOR SELECTIVELY DELETING PRINT JOBS STORED IN A RECEPTION BUFFER BASED ON DELETION DATA RECEIVED FROM AN EXTERNAL APPARATUS

[75] Inventor: Yoshiyuki Kojo, Yokohama, Japan

[73] Assignee: Canon Kabushiki Kaisha, Tokyo, Japan

[21] Appl. No.: 140,498

[22] Filed: Oct. 25, 1993

[30] Foreign Application Priority Data

Oct. 30, 1992 [JP] Japan ................................. 4-315882

[51] Int. Cl.$^6$ ......................... G06F 12/06; G06F 3/12
[52] U.S. Cl. ..................... 395/113; 395/101; 395/115
[58] Field of Search ............................... 395/275, 425, 395/101, 113, 115, 835, 839, 872

[56] References Cited

U.S. PATENT DOCUMENTS

| | | | |
|---|---|---|---|
| 3,643,227 | 2/1972 | Smith et al. | 340/172.5 |
| 4,441,163 | 4/1984 | Leikam et al. | 364/900 |
| 4,587,629 | 5/1986 | Dill et al. | 364/900 |
| 4,839,798 | 6/1989 | Eguchi et al. | 364/200 |
| 5,036,476 | 7/1991 | Yamaguchi et al. | 364/519 |
| 5,287,434 | 2/1994 | Bain et al. | 395/101 |
| 5,371,888 | 12/1994 | Lehnertz et al. | 395/650 |

FOREIGN PATENT DOCUMENTS

| | | |
|---|---|---|
| 332779 | 9/1989 | European Pat. Off. . |
| 479494 | 4/1992 | European Pat. Off. . |

OTHER PUBLICATIONS

"Page Printer Message Handler", IBM Technical Disclosure Bulletin, vol. 35, No. 5, Oct. 1992, pp. 278–280.

Primary Examiner—Lange Leonard Barry
Assistant Examiner—Rehana Perveen Krick
Attorney, Agent, or Firm—Fitzpatrick, Cella, Harper & Scinto

[57] ABSTRACT

In a printing-information processing method and apparatus, print jobs input from outside are sequentially stored in a reception buffer, analysis information of each of the stored print jobs is stored in a page buffer in parallel with the reception of the print jobs, and page data obtained from the stored analysis information is sequentially stored in the frame buffer. At that time, data for assigning deletion of a job input from the outside is also stored. Hence, an assigned print job stored in the reception buffer, or analysis information or page data stored in the page buffer or the frame buffer, respectively, corresponding to the assigned print job is deleted by analyzing the stored data for assigning deletion of a print job.

29 Claims, 7 Drawing Sheets

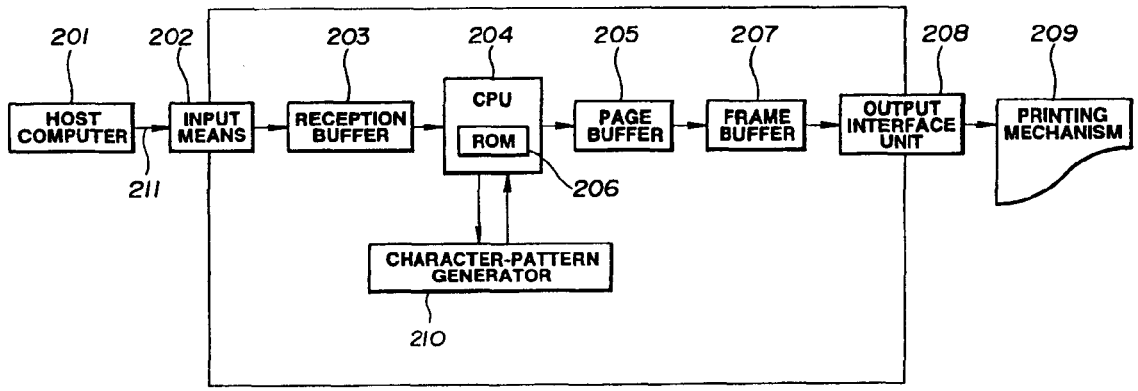

SYSTEM FOR SELECTIVELY DELETING PRINT JOBS STORED IN A RECEPTION BUFFER BASED ON DELETION DATA RECEIVED FROM AN EXTERNAL APPARATUS

BACKGROUND OF THE INVENTION

1. Field of the Invention

The present invention relates to a printing-information processing method and apparatus for use in a printer which is provided with buffers for temporarily storing data transmitted from a host.

2. Description of the Related Art

In conventional apparatus of this kind, the printer is provided with a buffer for temporarily storing data transmitted from a host, such as a host computer. Printing processing is executed by analyzing data stored in the buffer, for example, by bit-map development processing, and outputting an image signal to a print engine.

In some apparatus, the buffer can spool a plurality of data (or print jobs) transmitted from the host. Some apparatus also have the ability to delete data stored in a buffer according to an instruction from an operation panel on the main body of the apparatus so that subsequent data can be received.

However, deleting data within the buffer of a conventional apparatus clears all storable regions of the buffer. Hence, when a print job which is no longer needed is stored in the buffer with other print jobs, succeeding print jobs cannot be processed until the unneeded print jobs are output. As a result, considerable time is wasted while printing unneeded print jobs until the succeeding print job is output, also causing a waste of paper. On the other hand, if the above-described deletion processing of the buffer is performed, since the entire buffer is cleared, communication processing for receiving again the needed print jobs from the host is required, and the host apparatus must retransmit the needed job, causing a large loss in data processing efficiency.

SUMMARY OF THE INVENTION

The present invention has been made in consideration of the above-described problems.

It is an object of the present invention to provide a printing-information processing method and a printing information processing apparatus, in which an arbitrary print job, from among print jobs sequentially stored in a reception buffer, and data stored in a page buffer and a frame buffer relating to the arbitrary print job, can be selectively deleted, based on input data for assigning deletion of a job.

According to one aspect, the present invention relates to a printing-information processing method and apparatus in which data for assigning deletion of an arbitrary print job, input by interrupt from outside of the apparatus, is stored, while print jobs, input from outside of the apparatus, are sequentially stored in a reception buffer in units of a specific command group. Analysis information corresponding to each of the stored print jobs is stored in a page buffer, and page data obtained from the stored analysis information is sequentially stored in a frame buffer. The stored data for assigning deletion of a job is analyzed, and an assigned print job stored in the reception buffer, or analysis information or page data stored in the page buffer or the frame buffer, respectively, corresponding to the assigned print data is deleted.

In the printing-information processing method and apparatus of the present invention, print jobs input from outside of the apparatus are sequentially stored in the reception buffer; analysis information of each of the stored print jobs is stored in the page buffer in parallel with the reception of the print job; and page data obtained from the stored analysis information are sequentially stored in the frame buffer. At that time, since data for assigning deletion of a print job input from the outside is stored, at least one of the following is deleted: an assigned print job stored in the reception buffer, corresponding analysis information stored in the page buffer, or corresponding page data stored in the frame buffer. Hence, even when a plurality of print jobs are stored in the reception buffer, only the assigned print job can be deleted, and analysis information or page data stored in the page buffer or the frame buffer, respectively, corresponding to the assigned print job can also be deleted.

BRIEF DESCRIPTION OF THE DRAWINGS

FIG. 1 is a cross-sectional view illustrating a configuration of a printer to which a printing-information processing apparatus of the present invention can be applied;

FIG. 2 is a block diagram illustrating the configuration of a printing-information processing apparatus according to an embodiment of the present invention;

FIG. 3 is a flowchart illustrating a main processing procedure in the printing-information processing apparatus shown in FIG. 2;

FIG. 4 is a flowchart illustrating the procedure of first job-clear interrupt processing in the printing-information processing apparatus shown in FIG. 2;

FIG. 5 is a flowchart illustrating a detailed procedure of the analysis processing routine shown in FIG. 3;

FIG. 6 is a schematic diagram illustrating processing states when deleting an assigned print job using the printing-information processing apparatus of the present invention; and FIG. 7 is a flowchart illustrating the procedure of second job-clear interrupt processing in the printing-information processing apparatus of the present invention.

DESCRIPTION OF THE PREFERRED EMBODIMENTS

First Embodiment

FIG. 1 is a cross-sectional view illustrating the configuration of a printer to which a printing-information processing apparatus of the present invention can be applied, and illustrates the case of using a laser-beam printer (LBP). The LBP can register character patterns, document forms and the like from a data source (not shown).

In FIG. 1, main body (printer) 1500 of the LBP receives and stores print information (character codes and the like), form information, macro-instructions, and the like supplied from a host computer connected to the LBP. The LBP forms character patterns (generated from character-pattern processing according to the invention), a form pattern and the like in accordance with the stored information, and forms an image on recording paper, serving as a recording medium. Operation panel 1501 includes switches for operations, an LED (light-emitting diode) display unit, and the like. Printer control unit 1000 controls the entire main body 1500 of the LBP, analyzes character information and the like supplied from the host computer, converts the character information into a video signal representing character patterns, and outputs the video signal to laser driver 1502.

Laser driver 1502 is a circuit for driving semiconductor laser 1503, and switches on and off laser light 1504 emitted from semiconductor laser 1503 in accordance with the input video signal. Laser light 1504 is deflected in directions perpendicular to the plane of FIG. 1 to scan and expose a surface of electrostatic drum 1506. Thus, an electrostatic latent image of character patterns is formed on electrostatic drum 1506. The latent image is developed by developing unit 1507 disposed around electrostatic drum 1506. The developed image is then transferred onto a recording medium, such as recording paper. The recording paper comprises cut sheets, which are accommodated within sheet cassette 1508 mounted in main body 1500 of the LBP. Each sheet of the recording paper is conveyed within the apparatus by sheet-feeding roller 1509, conveying roller 1510 and conveying roller 1511, and is supplied to electrostatic drum 1506.

FIG. 2 is a block diagram illustrating the configuration of a printing-information processing apparatus according to an embodiment of the present invention.

In FIG. 2, host computer 201, serving as a generation source of image information, transmits information 211, comprising character-code information, character-font information, form information, macro-registration information and the like, to LBP input means 202. Reception buffer 203 temporarily stores the various kinds of information input from input means 202. Character-pattern generator 210 includes a font ROM (read-only memory) for storing pattern information for respective character codes, and a reading control circuit for the ROM. Character-pattern generator 210 has the code conversion function of calculating the address of a character pattern corresponding to an input character code.

CPU 204 controls the entire control system of the LBP, and controls the entire apparatus by control programs (whose flowcharts will be described later) of CPU 204 stored in ROM 206. Page buffer 205 analyzes information stored in reception buffer 203, and stores data obtained by the analysis as intermediate data before image development. Frame buffer 207 stores pattern information developed in character patterns for print images of at least one page. Output interface unit 208 generates a video signal corresponding to the pattern information stored in frame buffer 207, and activates the interface control of printing mechanism (printer engine) 209. Printing mechanism 209 receives the video signal from output interface unit 208 and prints image information in accordance with the video signal.

In a printing-information processing apparatus having the above-described configuration, if data for assigning deletion of a print job for deleting a desired print job stored in reception buffer 203 is input from an assigning means while print jobs input from the outside in units of a specific command group are sequentially stored in reception buffer 203, an analysis means (CPU 204) analyzes each of the print jobs. The obtained analysis information is stored in page buffer 205, and page data, which is obtained from the stored analysis information, is stored in frame buffer 207. The input data for assigning deletion of a print job is held in a RAM (random access memory) (not shown). CPU 204 deletes an assigned print job stored in reception buffer 203 based on the state of registration of the data for assigning deletion of a job in RAM (not shown), or deletes analysis information or page data stored in page buffer 205 or frame buffer 207, respectively, based on the assigned print job. Accordingly, even if a plurality of print jobs are stored in reception buffer 203, it is possible to delete only the assigned print job, as well as analysis information or page data stored in page buffer 205 or frame buffer 207, respectively, corresponding to the assigned print job.

In addition, since data for assigning deletion of a print job for deleting a desired print job stored in reception buffer 203 is input from the operation panel of the main body of the printer, the assignment of deletion of a print job input from the outside can be performed at the side of the main body of the apparatus.

Furthermore, since data for assigning deletion of a print job for deleting a desired print job stored in reception buffer 203 is input from external host computer 201, the assignment of deletion of a print job input from the outside can be performed from the data source.

First, a description will be provided of the operation of data processing from host computer 201 with reference to FIG. 3.

FIG. 3 is a flowchart illustrating a main processing procedure in the printing-information processing apparatus shown in FIG. 2. Numerals (1)–(5) represent processing steps.

First, reception processing is performed when printing data has been input (step (1)). Upon completion of the reception processing, analysis processing of the printing data is performed (step (2)), and bit-map data development processing is performed (step (3)). Thereafter, output processing of bit-map data is performed, and the bit map data is output to a printer engine (not shown) (step (4)). In step (5), it is determined if the input of information has ended. If the result of the determination is negative, the process returns to step (1). If the result of the determination is affirmative, the processing is terminated. While such processing is executed, CPU 204 monitors if an interrupt request of job-clear processing has been entered from the outside through the operation panel or the like. When an interrupt request of job-clear processing has been recognized, job-clear interrupt processing shown in FIG. 4 is started.

FIG. 4 is a flowchart illustrating a procedure of first job-clear interrupt processing in the printing-information processing apparatus of the present invention. Numerals (1)–(8) represent processing steps.

First, it is determined if the print job to be cleared is currently being analyzed, developed, or output (step (1)). If the result of the determination is affirmative, data being output is output. At the same time, if data being developed is present in frame buffer 207, that data is cleared (step (5)). If data corresponding to the target print job is present in page buffer 205, that data is cleared (step (6)). If data corresponding to the target print job is present in reception buffer 203, that data is cleared (step (7)). The process then proceeds to analysis processing of the next print job (step (8)).

If the result of the determination in step (1) is negative, it is determined if the job to be cleared is present in reception buffer 203 (step (2)). If the result of the determination is negative, the process returns to ordinary processing. If the result of the determination is affirmative, a job-clear flag is switches on (step (3)), and the name of the job to be cleared is set in an assigned storage area (step (4)). The process then returns to the main processing shown in FIG. 3.

FIG. 5 is a flowchart illustrating a detailed procedure of the analysis processing routine shown in FIG. 3. Numerals (1)–(5) represent processing steps.

First, it is determined if a job-clear flag is switched on according to the flowchart shown in FIG. 4. If the result of the determination is negative, the process proceeds to step (3), where ordinary analysis processing is executed, and the process is terminated.

If the result of the determination in step (1) is affirmative, it is determined if the job transferred from reception buffer 203 is the job to be cleared. This is done by comparing the transferred job with the name of the job set in the storage area (step (2)). If the result of the determination is negative, the process proceeds to step (3). If the result of the determination is affirmative, the target job is deleted from reception buffer 203 (step (4)), the job-clear flag is reset (step (5)), and the process returns to the main processing.

Accordingly, as shown in FIG. 6, when a command to clear job #2 has been input to input means 202 from the outside (for example, from the operation panel or from host computer 201, serving as the host apparatus) while jobs #1–#3 are stacked in reception buffer 203 and job #1 is being analyzed, developed and output, printing data for job #2 is deleted after the completion of the processing of job #1. As a result, only print job #3 remains stacked on reception buffer 203, and the processing of analyzing, developing and outputting job #3 is started.

As described above, in the printing-information processing method of the present invention, while print jobs input from the outside are sequentially stored in reception buffer 203, analysis information of each of the stored print jobs is stored in page buffer 205 in parallel to the reception of the print jobs. In addition, page data obtained from the stored analysis information is sequentially stored in frame buffer 207, and data for assigning deletion of a print job input from the outside is stored in RAM (not shown). The assigned print job stored in reception buffer 203, or analysis information or page data stored in page buffer 205 or frame buffer 207, respectively, corresponding to the assigned print job is deleted by analyzing the stored data for assigning deletion of a job. Hence, even if a plurality of print jobs are stored in reception buffer 203, it is possible to delete only the assigned print job, as well as analysis information or page data stored in page buffer 205 or frame buffer 207, respectively, corresponding to the assigned print job.

In the above-described embodiment, a description has been provided of the case in which allocation of data from input means 202 is not performed within reception buffer 203. However, in a printer having a plurality of input means in which data can be allocated in reception buffer 203 so as to correspond to the respective input means, the corresponding input means may be assigned a job-clear assignment. That is, since print jobs input via respective data input units (not shown) are registered in reception buffer 203 while being allocated by CPU 204, it is possible to delete, from reception buffer 203, only the print job input by the assigned data input unit, as well as analysis information or page data stored in page buffer 205 or frame buffer 207, respectively, corresponding to the assigned print job.

Second Embodiment

FIG. 7 is a flowchart illustrating the procedure of second job-clear interrupt processing in the printing-information processing apparatus of the present invention. Numerals (1)–(6) represent processing steps.

When a job-clear interrupt has been received from outside of the main processing shown in FIG. 3, it is determined if the print job, received from input means which assigns job clear is currently being subjected to analysis/development/output processing (step (1)). If the result of the determination is affirmative, in parallel with the processing of outputting printing data, if it is present, the contents of frame buffer 207 performing development processing are cleared (step (4)), the contents of page buffer 205 performing analysis processing are cleared (step (5)), the corresponding print job remaining in reception buffer 203 is cleared (step (6)), and the process returns to step (2).

On the other hand, if the result of the determination in step (1) is negative, it is determined if the corresponding print job is stored in a region of reception buffer 203 corresponding to the input means which assigns job clear (step (2)). If the result of the determination is negative, the process returns to main processing. If the result of the determination is affirmative, the corresponding print job is cleared from reception buffer 203 (step (3)). Thus, the processing is terminated, and the process returns to main processing.

As described above, in the printing-information processing method of the present invention, while print jobs input from the outside are sequentially stored in reception buffer 203, analysis information of each of the stored print jobs is stored in page buffer 205 in parallel to reception of the print jobs, page data obtained from the stored analysis information is sequentially stored in frame buffer 207, and data for assigning deletion of a print job input from the outside is stored. The assigned print job stored in reception buffer 203, or analysis information or page data stored in page buffer 205, or frame buffer 207, respectively, corresponding to the assigned print job is deleted by analyzing the stored data for assigning deletion of a print job. Hence, even if a plurality of print jobs are stored in reception buffer 203, it is possible to delete only the assigned print job, as well as analysis information or page data stored in page buffer 205 or frame buffer 207, respectively, corresponding to the assigned print job.

In the printing-information processing apparatus of the present invention, if data for assigning deletion of a print job for deleting a desired print job stored in reception buffer 203 is input from an assigning means while print jobs in units of a specific command group input from the outside are sequentially stored in reception buffer 203, analysis means analyzes each of the print jobs. The obtained analysis information is stored in page buffer 205, and page data obtained from the stored analysis information is stored in frame buffer 207. The input data for assigning deletion of a print job is held in holding means. Job deletion means deletes the assigned print job stored in reception buffer 203, or analysis information or page data stored in page buffer 205 or frame buffer 207, respectively, corresponding to the assigned print job based on the state of registration of the job deletion assigning data held in the holding means. Accordingly, even if a plurality of print jobs are stored in reception buffer 203, it is possible to delete only the assigned print job, as well as analysis information or page data stored in page buffer 205, or frame buffer 207, respectively, corresponding to the assigned print job.

In addition, since data for assigning deletion of a print job for deleting a desired print job stored in reception buffer 203 is input from the operation panel of the main body of the printer, the assignment of deletion of a print job input from the outside can be input from a side of the main body of the apparatus.

Furthermore, since data for assigning deletion of a print job for deleting a desired print job stored in reception buffer 203 is input from external host computer 201, the assignment of deletion of a print job input from the outside can be performed from the data source.

Since print jobs input from respective data input units are registered in reception buffer 203 while being allocated by registration means, it is possible to delete only the print job input from the assigned data input unit from reception buffer 203, as well as analysis information or page data stored in page buffer 205, or frame buffer 207, respectively, corresponding to the assigned print job.

The present embodiment of the invention enables a user to easily select and delete any print job sequentially stored in the reception buffer.

While the present invention has been described with respect to what is presently considered to be the preferred embodiments, the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications, equivalent structures, and functions.

What is claimed is:

1. A printing-information processing method, comprising the steps of:

inputting print jobs in units of a command group from an external apparatus;

storing the print jobs in a reception buffer;

inputting deletion data from the external apparatus;

storing the deletion data in a holding means;

assigning deletion of a print job based on the deletion data;

analyzing the assigned print job to produce analysis information corresponding to the print job;

storing the analysis information in a page buffer, at least a portion of the assigned print job being stored in the reception buffer during analysis of the assigned print job;

determining whether the assigned print job is currently being analyzed; and deleting analysis information corresponding to portions of the assigned print job, analyzed in the analyzing step, from the page buffer when the determining step determines that the assigned print job is currently being analyzed, and deleting the assigned print job from the reception buffer when the determining step determines that the assigned print job is not currently being analyzed.

2. A printing-information processing apparatus comprising:

a reception buffer for sequentially storing print jobs in units of a command group input from an external apparatus;

analysis means for analyzing each of the stored print jobs;

a page buffer for storing analysis information provided by said analysis means;

inputting means for inputting deletion data from the external apparatus;

assigning means for receiving the deletion data and for assigning deletion of a print job based on the received deletion data, at least a portion of the print job being stored in said reception buffer;

holding means for holding the deletion data received from said assigning means;

determining means for determining whether the assigned print job is currently being analyzed by said analysis means; and job deletion means for deleting (1) analysis information corresponding to portions of the assigned print job, analyzed by said analysis means, from said page buffer when said determining means determines that the assigned print job is currently being analyzed and (2) the assigned print job from said reception buffer when said determining means determines that said analysis means is not currently analyzing the assigned print job.

3. An apparatus according to claim 2, wherein said assigning means comprises an operation panel provided in a main body of a printer.

4. An apparatus according to claim 2, wherein said assigning means comprises an external host computer.

5. An apparatus according to any of claims 2 through 4, further comprising:

a plurality of data input units; and registration means for registering respective print jobs input via said data input units in said reception buffer while allocating the print jobs.

6. A method according to claim 1, wherein the deletion data for assigning deletion of a job is obtained by an instruction from an operation panel provided in a main body of a printer.

7. A method according to claim 1, wherein the deletion data for assigning deletion of a job comprises data from a host computer.

8. A method according to claim 1, further comprising the step of storing, in a memory, pattern data obtained from said stored analysis information.

9. A method according to claim 8, further comprising the step of forming an image in accordance with the pattern data stored in said memory.

10. An apparatus according to claim 2, further comprising a memory for storing pattern data obtained from said stored analysis information.

11. An apparatus according to claim 10, further comprising image forming means for forming an image in accordance with the pattern data stored in said memory.

12. A printing-information processing method according to claim 1, wherein the analysis information stored in the page buffer comprises data which is to be processed into bit map data.

13. A printing-information processing apparatus according to claim 2, wherein the analysis information stored in the page buffer comprises data which is to be processed into bit map data.

14. Computer-executable process steps stored on a computer-readable medium, the computer-executable process steps for processing and deleting print jobs input from an external apparatus, the computer executable process steps comprising:

an inputting step to input print jobs in units of a command group from an external apparatus;

a storing step to store the print jobs in a reception buffer;

an inputting step to input deletion data from the external apparatus;

a storing step to store the deletion data in a holding means;

an assigning step to assign deletion of a print job based on the deletion data;

an analyzing step to analyze the assigned print job to produce analysis information corresponding to the print job;

a storing step to store the analysis information in a page buffer, at least a portion of the assigned print job being stored in the reception buffer during analysis of the assigned print job;

a determining step to determine whether the assigned print job is currently being analyzed; and a deleting step to delete analysis information corresponding to portions of the assigned print job, analyzed in the analyzing step, from the page buffer when the determining step determines that the assigned print job is currently being analyzed, and to delete the assigned print job from the reception buffer when the determining step determines that the assigned print job is not currently being analyzed.

15. Computer-executable process steps according to claim 14, wherein the analysis information stored in the page buffer comprises data which is to be processed into bit map data.

16. A system which deletes print jobs and corresponding analysis information from a printer in response to input deletion data, the system comprising:

a host computer which generates and outputs print jobs, the print jobs being output in units of a command group; and a printer, connected to the host computer, which receives and analyzes the print jobs output from the host computer, and which deletes print jobs, and corresponding analysis information, based on the deletion data, the printer comprising:

a reception buffer which sequentially stores the print jobs received from the host computer;

a page buffer which stores analysis information corresponding to print jobs which have been analyzed by the printer;

a memory which stores the deletion data received from the host computer; and a processor (1) which assigns deletion of a print job based on the received deletion data, at least a portion of the print job assigned for deletion being stored in the reception buffer, (2) which determines whether the print job assigned for deletion is currently being analyzed, and (3) which deletes analysis information from the page buffer corresponding to portions of the print job assigned for deletion when it is determined that the print job assigned for deletion is currently being analyzed, and which deletes the print job assigned for deletion from the reception buffer when it is determined that the print job assigned for deletion is not currently being analyzed.

17. A system according to claim 16, wherein the printer includes an operational panel through which the deletion data is input.

18. A system according to claim 16, wherein the host computer comprises an input unit through which the deletion data is input.

19. A system according to claim 16, wherein the host computer includes a plurality of data input units, through which the print jobs are input; and wherein the processor in the printer registers print jobs in the reception buffer.

20. A system according to claim 16, wherein the processor in the printer generates pattern data corresponding to analysis information for a print job stored in the page buffer; and wherein the printer further comprises a frame buffer for storing the pattern data.

21. A system according to claim 20, wherein the printer forms an image in accordance with the pattern data stored in the frame buffer.

22. A system according to claim 16, wherein the analysis information stored in the page buffer comprises data which is to be processed into bit map data.

23. A printer which receives and analyzes print jobs, and which deletes print jobs and corresponding analysis information based on deletion data input from an external source, the printer comprising:

a reception buffer which sequentially stores the print jobs;

a page buffer which stores analysis information corresponding to print jobs which have been analyzed by the printer;

a memory which stores the deletion data input from the external source; and a processor (1) which assigns deletion of a print job based on the received deletion data, at least a portion of the print job assigned for deletion being stored in the reception buffer, (2) which determines whether the print job assigned for deletion is currently being analyzed, and (3) which deletes analysis information from the page buffer corresponding to portions of the print job assigned for deletion when it is determined that the print job assigned for deletion is currently being analyzed, and which deletes the print job assigned for deletion from the reception buffer when it is determined that the print job assigned for deletion is not currently being analyzed.

24. A printer according to claim 23, wherein the external source comprises an operational panel on the printer.

25. A printer according to claim 23, wherein the external source comprises a host computer having an input unit through which the deletion data is input.

26. A printer according to claim 23, wherein the printer is connected to a host computer having a plurality of data input units, the print jobs being input to the printer via the plurality of data input units on the host computer; and wherein the processor registers the print jobs in the reception buffer.

27. A printer according to claim 23, wherein the processor generates pattern data corresponding to analysis information for a print job stored in the page buffer; and wherein the printer further comprises a frame buffer for storing the pattern data.

28. A printer according to claim 27, wherein the printer forms an image in accordance with the pattern data stored in the frame buffer.

29. A printer according to claim 23, wherein the analysis information stored in the page buffer comprises data which is to be processed into bit map data.

* * * * *